UNITED STATES PATENT OFFICE.

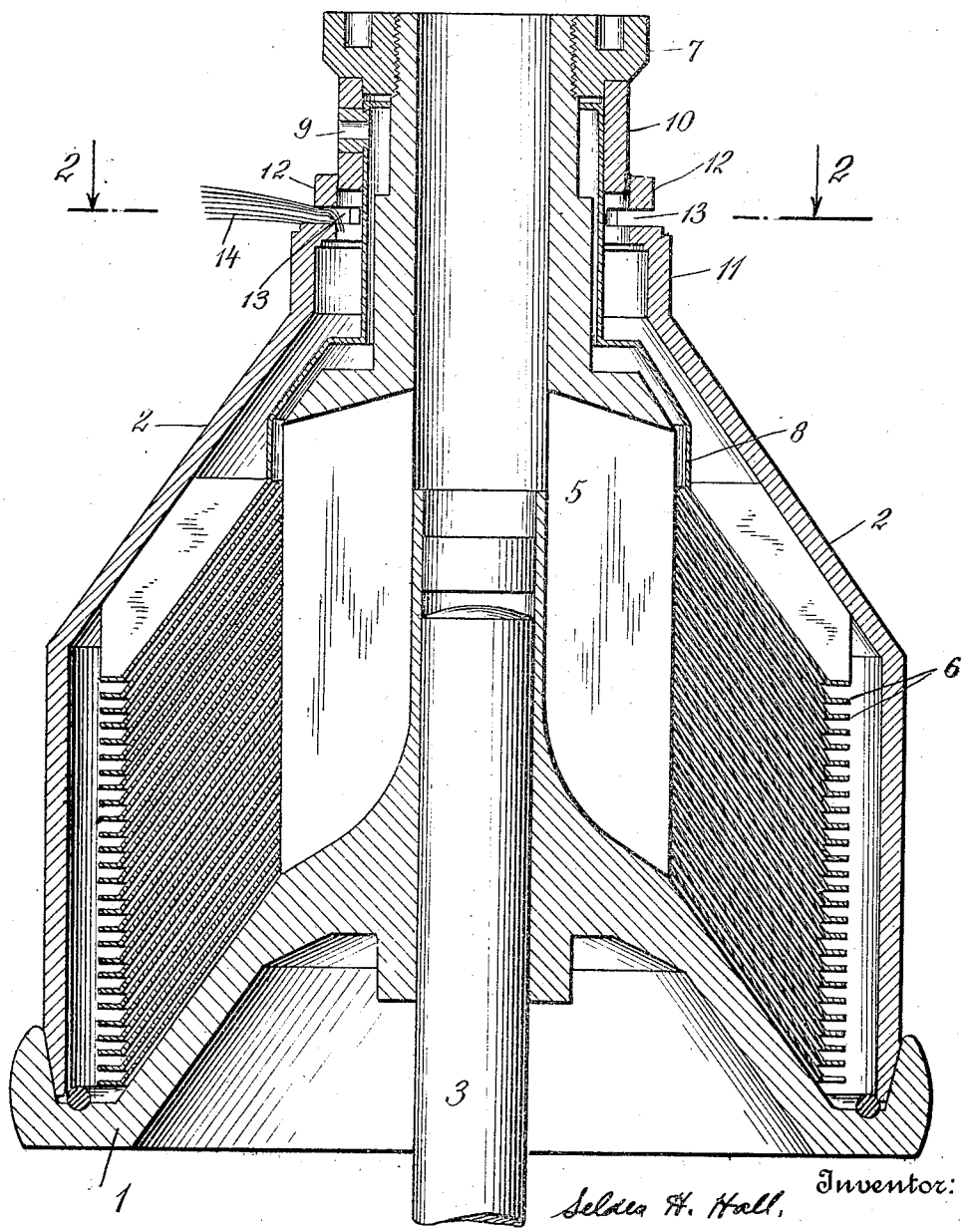

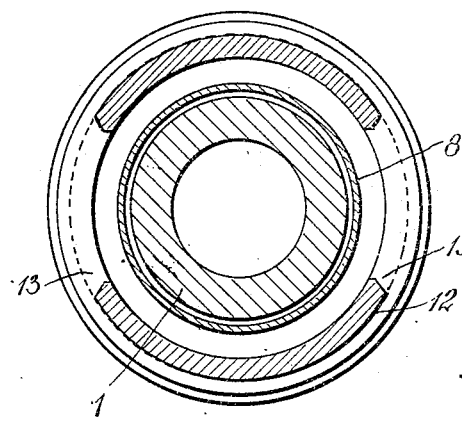
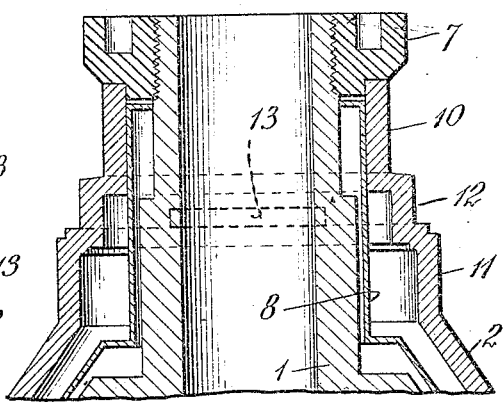
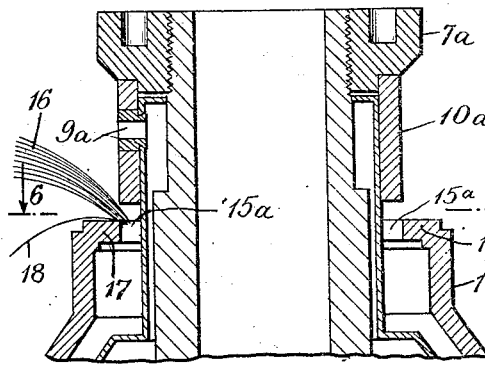
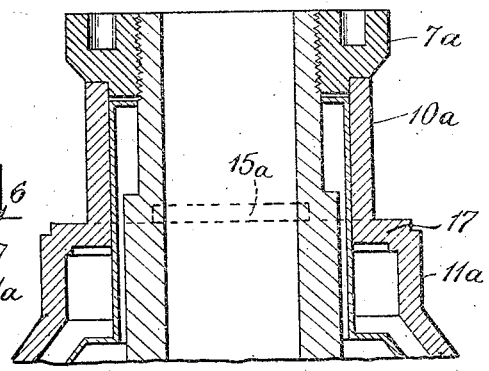
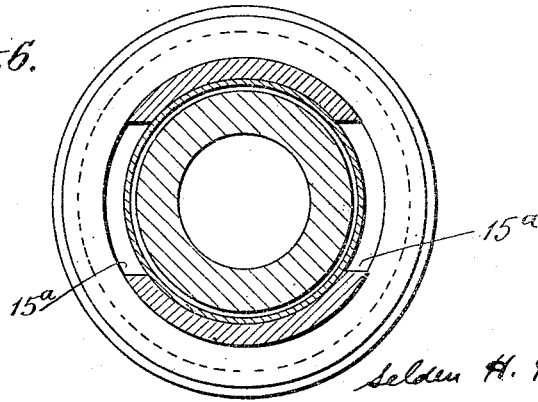

SELDEN H. HALL, OF POUGHKEEPSIE, NEW YORK, ASSIGNOR TO THE DE LAVAL SEPARATOR COMPANY, OF NEW YORK, N. Y., A CORPORATION OF NEW JERSEY.

CENTRIFUGAL-SEPARATOR BOWL-SHELL.

1,290,983.   Specification of Letters Patent.   Patented Jan. 14, 1919.

Application filed October 31, 1917. Serial No. 199,425.

*To all whom it may concern:*

Be it known that I, SELDEN H. HALL, a citizen of the United States, residing at Poughkeepsie, in the county of Dutchess, State of New York, have invented certain new and useful Improvements in Centrifugal-Separator Bowl-Shells; and I do hereby declare the following to be a full, clear, and exact description of the invention, such as will enable others skilled in the art to which it appertains to make and use the same.

In the smaller sizes of centrifugal cream separators the bowl shell is ordinarily provided with a wide horizontal step just below the neck of the bowl, and the skim milk discharge orifice is formed by milling and broaching through the inner part of this step. The resulting discharge orifice or hole is wide open on the top and the skim milk flowing rapidly up the inside of the bowl continues to flow upward after leaving the opening. I believe it to be generally supposed that the milk escapes from the bowl horizontally, but examination through a synchronous shutter discloses the fact that while a little of the milk does escape horizontally, the main stream is upward at an angle of from 20 to 40°, varying with the shape of the orifice.

The result of this upward flow is that frequently some of the skim milk issuing from the bowl spatters over the edge of the cream-receiving hopper and dilutes the cream. Furthermore, as one part of the milk escapes horizontally and another part of it at an upward angle, the stream is correspondingly ragged and entrains air so as to make considerable froth.

In addition to the disadvantages in operation above noted, the construction referred to is defective for the reason that the outside of the bowl neck is of much smaller diameter than the inside of the shell below the horizontal step, for which reason the bowl is so weak that it is possible to deform it by screwing down on the bowl nut. Still another fault of the ordinary construction lies in the fact that it is difficult to make a milling cutter or a broaching tool cut a discharge opening exactly concentric with the neck of the bowl above said opening, and variations from concentricity even though slight, cause great variations in the performance of the bowls.

Accordingly, the present invention has four objects to wit—

1. To so govern the discharge of skim milk from the bowl as to prevent it from entering the cream hopper;
2. To reduce the amount of froth formed;
3. To make a stronger bowl shell; and
4. To simplify manufacture.

The first and second objects of the invention are accomplished by providing, immediately above the skim milk outlet, a horizontal shroud or abutment against which the the ragged upwardly-flying stream of skim milk strikes and by which it is deflected into a comparatively smooth horizontal stream. The third object of the invention is accomplished by providing the bowl with two narrow horizontal steps instead of one wide one; and the fourth object of the invention is accomplished by making the weir over which the milk escapes of continuous or uninterrupted circular contour which to insure concentricity with the neck of the bowl, may be machined at the same operation as the bowl.

In the accompanying drawings,—

Figure 1 represents a vertical section of a centrifugal cream separator embodying my improvements, the section being taken on a plane passing through the skim milk orifices, the shaft of the bowl being shown in elevation;

Fig. 2 represents a cross-sectional view taken on a plane indicated by the line 2—2 of Fig. 1;

Fig. 3 represents a vertical section of the upper part of the bowl taken on a plane at right angles to the section shown in Fig. 1;

Fig. 4 represents a vertical section of the upper part of a bowl of the ordinary construction taken on a plane through the skim milk discharge orifices;

Fig. 5 represents a like view taken on a plane at right angles to Fig. 4; and

Fig. 6 represents a cross-sectional view taken on a plane indicated by the line 6—6 of Fig. 4.

Referring first to the ordinary construction exhibited in Figs. 4, 5 and 6 of the drawings, the numeral 15ª indicates the customary skim milk outlets, of which there are two, located respectively on opposite sides of the bowl. 9ª indicates the cream outlet, which is usually a single orifice. In this common type of separator bowl, the bowl neck 10ª is supported by a wide horizontal step 17 which is, in turn, supported by a lower portion 11ª of the shell having an internal diameter much greater than the external diameter of the bowl neck. The outside diameter of the bowl neck 10ª is less than the diameter across the weirs of the skim milk outlets 15ª.

It will be noted, accordingly, that in this common or ordinary construction of the smaller sizes of cream separators, the holes or apertures 15ª are wide open on the top, so that after leaving the openings, the skim milk continues to flow upwardly. In Fig. 4, the numeral 16 indicates approximately the form of the main skim milk stream escaping from this form of orifice, while 18 indicates a small stream usually seen escaping horizontally or at an angle downwardly.

Examination of the skim milk outlet shown in Fig. 4 shows how the stream of skim milk escaping over the weir, is free to continue in its upward direction and is not only liable to partly pass over the edge of the usual cream-receiving hopper, but also to break into a ragged froth-producing spray. So also, Fig. 5 shows clearly the relative weakness of the customary bowl shell, wherein the bowl neck 10ª, supported upon the single wide horizontal step 17 exposes the bowl to the danger of deformation upon the screwing down of the bowl nut 7ª.

Referring now to Figs. 1, 2 and 3, which illustrate the improved construction embodying my invention, the numeral 1 indicates the bottom, and 2 the shell of the bowl, supported and driven by the shaft 3, and which may have the usual liners 6, wings 5, cream disk 8, cream-discharge 9, bowl-nut 7, and the like, familiar to the art. 10 indicates the bowl neck of the same diameter as the bowl neck 10ⁿ of Figs. 4, 5 and 6, and 11 indicates a portion of the shell corresponding to the portion 11ª of Figs. 4, 5 and 6. In the construction shown in Figs. 1, 2 and 3, however, the bowl neck 10 is supported upon a relatively narrow step 12 intermediate of the bowl neck 10 and the portion 11. The outside diameter of the intermediate step 12 is, preferably, at least equal to the inside diameter of the portion 11, and the inside diameter of the step 12 is, at greatest, equal to the outside diameter of the neck 10. The skim milk orifices or outlets 13 are formed by milling through the vertical wall of the step 12 and the exact length is obtained by broaching out the feather edges left by the milling cutter. It is easy to bore the inside of the step 12 to exact size and this may be done at the same operation as the boring of the neck 10, thus insuring their concentricity. Approximately the form of skim milk stream discharged from the bowl of Figs. 1, 2 and 3, is shown at 14 in Fig. 1.

The controlling weir of each of the skim milk discharge orifices is a portion of a complete uninterrupted circle, and, as the discharge orifices are radially wide open, they are correspondingly easy to clean.

From Fig. 1 it will be plainly apparent how the first two objects of my invention are attained, to wit, by providing at each skim milk discharge, a horizontal surface or abutment, extending outward above the skim milk control weir, against which the upward stream of skim milk strikes and by which it is deflected into a horizontal stream which always passes under the cream-receiving hopper and which, because of its greater solidity does not make so much froth.

Fig. 3 shows plainly the greater strength incident to the provision of two relatively narrow steps instead of the single wide step of the common construction of bowl shell. So also, a comparison of Figs. 2 and 6 will indicate the ease of machining and finishing the skim milk discharge openings of the improved construction as compared with the difficulty of machining the skim milk discharge openings of the common or ordinary structure.

What I claim is:

1. A centrifugal milk separator bowl shell, provided with a neck of small diameter, a shoulder below the neck, said shoulder being of an internal diameter greater than the outside diameter of the neck, and a portion intermediate of the neck and said shoulder, said intermediate portion being provided with a skim milk discharge orifice and having an internal diameter not greater than the external diameter of the neck and an external diameter not less than the inside diameter of the said shoulder; substantially as described.

2. A centrifugal separator bowl, having a shell provided with three adjacent concentric vertical walls, the upper wall constituting the neck of the bowl and being of small diameter, the lowermost wall of the three having an internal diameter greater than the external diameter of the upper wall or bowl neck, and the intermediate wall having an internal diameter greater than that of the upper wall and less than that of the lower wall, and an external diameter greater than that of the upper wall and less than that of the lower wall, said intermediate wall being provided with a skim milk discharge orifice; substantially as described.

3. A centrifugal bowl shell having in combination a frusto conical top, a cylindrical neck and a plurality of cylindrical walls between the shell and the neck, the upper one of these walls having an internal diameter not greater than the external diameter of the neck and each succeeding wall having an internal diameter not greater than the external diameter of the wall above it; substantially as described.

In testimony whereof I affix my signature.

SELDEN H. HALL.